United States Patent Office 3,196,139
Patented July 20, 1965

3,196,139
POLYMERIZATION PROCESS AND CATALYSTS
Chris E. Best, Akron, Ohio, assignor to The Firestone Tire & Rubber Company, Akron, Ohio, a corporation of Ohio
No Drawing. Filed Jan. 5, 1962, Ser. No. 164,608
33 Claims. (Cl. 260—93.7)

This invention relates to a process for the polymerization of olefinic compounds to yield macromolecular polymers, and to certain novel catalysts for use in that process.

In recent years there have been developed catalytic processes for the polymerization of olefins which may be operated at moderate pressures and temperatures and which in many cases, depending upon the constitution of the catalysts used and the conditions of the polymerization reaction, yield high polymers of more or less predetermined chemical structure. Unfortunately, the catalysts used in these processes are constituted from, or involve as components, various organometallic compounds and/or various metallic oxides which are inherently costly and are available from only a few sources. Moreover, certain of these components may leave persistent toxic residues in the polymeric products. Further, although the stereospecific action of these processes has made possible the production of polymers of specialized structure, the possible variations in this field have by no means been exhausted.

Accordingly, it is an object of this invention to provide a novel catalytic process for the polymerization of olefinic compounds, and in particular olefinic hydrocarbons, to form useful and valuable high polymers.

Another object is to provide such a process which is operable at moderate pressures and temperatures in inexpensive equipment.

A further object is to provide such a process in which the catalysts used are independent of the relatively expensive and restricted metal alkyls and specially treated oxides employed in prior art processes.

A still further object is to provide such a process which is capable of stereospecific effects not achieved in the prior art.

Still another object is to provide novel catalytic compositions for use in the above and other processes.

Still another object is to provide such catalysts, the components of which will not leave deleterious residues in the polymeric products produced by the use thereof.

SYNOPSIS OF THE INVENTION

The above and other objects are secured, in accordance with this invention, in a process of polymerizing an olefinic compound by contacting it with a catalyst comprising a mixture of (A) a phosphide, arsenide or stibide of a metal of Groups I–A, II–A, II–B, III–A, or IV–A of the Periodic Table [1] plus (B) a compound such as a salt or an oxide of a heavy metal. The resultant polymers have molecular weights in the macromolecular range, and are of regular structure, the structures in any particular case being predetermined by the exact reagents used within the fields

[1] The version of the Periodic Table referred to is that given in Lange's "Handbook of Chemistry," fifth edition, Handbook Publishers, Inc., 1944, pages 54 and 55; and by the term "heavy metals" it is intended to designate all of the elements embraced by the heavy black lines within the bracket entitled "Heavy Metals," including the lanthanides or rare earth elements Nos. 57–71.

pointed out above, their ratio, and the conditions of reaction. In certain preferred areas of the invention, the polymers obtained are crystalline and high-melting. The catalysts of the invention, being based upon the inexpensive and widely available phosphides, arsenides and stibides, have substantial economic advantage over the catalysts of the prior art, and are superior to many of such catalysts in point of catalytic efficiency and quality of product.

THE OLEFINIC COMPOUNDS TO BE POLYMERIZED

The process of the invention is applicable to the polymerization of any of the ethylenically unsaturated monomers commonly polymerized, but finds especial application in the polymerization of unsaturated olefinic hydrocarbons which are in general less readily polymerizable than the more polar ethylenically unsaturated compounds. Olefinic hydrocarbons which may be polymerized in accordance with this invention include the mono-olefins, particularly such as contain an alpha-methylene group of the formula $H_2=C=$. In general it is preferred to use olefins containing not over 10 carbon atoms. Propylene is one monomer which is advantageously handled in the process of this invention, since the product under preferred conditions will have a high degree of crystallinity. Other suitable mono-olefins include for instance ethylene, butene-1, isobutylene, pentene-1, hexene-1, octene-1, 2-methyl butene-1, 2-methyl pentene-1, 3-methyl pentene-1, 3-ethyl pentene-1, cyclopentene, cyclohexene, styrene, alpha-methyl styrene, chlorostyrene, divinylbenzene, vinylnaphthalene and the like. Also amendable to the process of this invention are polyolefinic hydrocarbons such as butadiene, isoprene, chloroprene, fluoroprene, 1-cyanobutadiene, 3-methyl pentadiene-1,3,2-phenylbutadiene, cyclopentadiene, 2-methoxybutadiene, 1,4-pentadiene, 1,4,7-octatriene, 2,3-dimethyl butadiene, piperylene and the like. Likewise there may be employed non-hydrocarbon monomers including polar monomers such as methyl methacrylate, vinyl acetate, vinylidene chloride, vinylidene fluoride, vinylidene cyanide, chlorotrifluoroethylene, vinyl pyrrolidone, the lower alkyl acrylates, the lower alkyl methacrylates, the lower alkyl ethacrylates, vinyl ethers, vinylpropionate, acrylonitrile, cinnamic acid esters, methacrylonitrile, vinyl pyridine, vinyl carbazole and the like. The polymers produced from these monomers in accordance with this invention are of unbranched and regular structure, which latter may be adjusted to various appropriate desired configurations by proper choice of the reaction parameters. The invention can be used to make copolymers or interpolymers of any of the monomers indicated above. Likewise the invention can be utilized to polymerize a prepolymer or partially polymerized compound with itself or with another ethylenically unsaturated compound.

THE METAL PHOSPHIDES, ARSENIDES AND STIBIDES

These may be any of the arsenides, phosphides or stibides of any of the metals of Groups I–A, II–A, II–B, III–A or IV–A as listed in the Periodic Table given in Lange's "Handbook of Chemistry," fifth edition, Handbook Publishers, Inc., 1944, pages 54 and 55. In general these are metals of high reducing potential and include for instance lithium, sodium, potassium, rubidium, cesium, beryllium, magnesium, calcium, strontium, zinc, cadmium, mercury, barium, aluminum, gallium, indium, thallium, germanium, tin, lead, and equivalents such as ammonium, mono-, di- and tri-hydrocarbon substituted ammoniums, tetrahydrocarbon - substituted ammonium (i.e. quaternary ammonium), and the like. Any of the phosphides, arsenides or stibides of these metal (cations) may be used, such as lithium phosphide ($Li_3P$), sodium phosphide ($Na_3P$), mixed metal phosphides such as lithium magnesium phosphide (LiMgP), condensed phosphides such as those of the formulae $Li_2P_5$, $Na_2P_5$, $K_2P_5$, and the like, magnesium phosphide ($Mg_3P_2$), calcium phosphide ($Ca_3P_2$), barium phosphide ($Ba_3P_2$), zinc phosphides ($ZnP_2$ and $Zn_3P_2$), aluminum phosphide (AlP), gallium phosphide (GaP), the tin phosphides ($Sn_5P_2$, $Sn_2P$, $Sn_3P$, SnP, $SnP_2$, $Sn_3P_4$, $Sn_4P_3$, $SnP_3$), lead phosphide ($PbP_2$), lithium arsenide, sodium arsenide, potassium arsenide, magnesium arsenide, calcium arsenide, aluminum arsenide, gallium arsenide, tin arsenide, lead arsenide, zinc arsenide, lithium stibide, calcium stibide, potassium stibide, sodium stibide, magnesium stibide, aluminum stibide, zinc stibide, tin stibide, tetramethylammonium phosphide, and the like.

In general the more salt-like the nature of the compound (Van Wazer), "Phosphorus and its Compounds," Interscience Publishers, Inc., 1958, pp. 123–125), the greater is its catalytic efficiency. Thus, the phosphides have the highest catalytic activity and the stibides the lowest. Also, the more strongly basic the compound, the greater is its catalytic activity. Preferred are the phosphides, arsenides, and stibides which react with an active hydrogen-containing compound, particularly water, to liberate hydrides of the phosphorus, arsenic or antimony respectively. A particularly preferred group of compounds possessing this property are the phosphides, arsenides and stibides formed by the metals of Groups I–A and II–A.

It will be understood that mixtures of phosphides, arsenides and stibides such as above indicated as being suitable may also be employed. The various phosphides, arsenides and stibides are known compounds and in general are very simply prepared by direct reaction at moderately elevated temperatures of elemental phosphorus, arsenic or antimony with the free metal whose phosphide, arsenide or stibide is desired. These compounds will be widely available, or indeed can be made in any establishment desiring to practice the invention. A method of producing these compounds, particularly the phosphides of the Group I–A metals having enhanced catalytic activity has been discovered and is described infra. The compounds may also be prepared by heating the elements thereof together in an inert atmosphere.

THE HEAVY METAL COMPOUNDS

The heavy metal salts and oxides forming the other components of the catalysts of this invention are those of the heavy metals, (i.e., those metals embraced by the heavy black lines within the brackets entitled "Heavy Metals" including the lanthanides or rare earth elements Nos. 57–71 in the Periodic Table on pages 54 and 55 of Lange's Handbook cited above). In general the compounds used will be oxides of these metals or salts thereof such as the fluorides, chlorides, bromides, iodides, cyclopentadienyl compounds, acetylacetonates, acetates, alkoxides or the like, it being understood that the salts need not be simple salts but may be the oxy-salts or salts containing different anions. Particularly preferred are the compounds of the transition metals, that is, the compounds of the metals of Groups IV–B and V–B of the Periodic Table cited supra. It is further preferred to use such compounds in a lower valence state, i.e., in a valence below the highest normal valence of the metal. Such reduced valence compounds are desirably formed by reducing a higher valence compound of the IV–B or V–B metal by contact with a metal above the IV–B or V–B metal in the electromotive series or other powerful reducing agent under conditions so as to provide a finely dispersed catalyst. Specific suitable heavy metal compounds for use in this invention include for instance titanium tetrachloride, zirconium tetrachloride, zirconium acetylacetonate, titanium tetrabutoxide, vanadium oxytrichloride, ferric chloride, ferrous chloride, antimony pentachloride, bismuth trichloride, titanium trichloride, stannic chloride, cobaltous chloride, antimonyl chloride, tungsten pentachloride, chromium chloride, nickel chloride, and the like. It will be understood that mixtures of compounds above indicated as suitable may also be used.

THE PREPARATION OF THE CATALYSTS AND CONDUCT OF THE POLYMERIZATION REACTION

The catalysts of this invention are prepared by mixing and agitating the selected phosphide, arsenide or stibide and heavy metal compound together, preferably in a saturated aliphatic or an aromatic liquid hydrocarbon vehicle such as petroleum ether, heptane, kerosene, mineral oil, diesel oil, benzene, toluene or the like. Usually the phosphide, arsenide or stibide will be insoluble in the medium, and in many cases the heavy metal compound will also be insoluble. It may be advisable, in order to promote the reaction with the solids, to subject the catalyst mass to grinding, as in a ball mill. Temperature of mixing may vary within wide limits, usually between $-10°$ C. or lower, as down to $-100°$ C., up to temperatures on the order of 150° C. Preferably the temperature will be in the range 20° C.–100° C. As to the relative proportions of the ingredients, usually a sufficient quantity of the phosphide, arsenide or stibide will be used so as to supply at least about 0.1 gram-atom of phosphorus, arsenic or antimony for each mol of the heavy metal compound. The upper limit is not critical, and is set mainly by economic considerations of cost of supplying unnecessary phosphide, arsenide or stibide. It will usually be desirable to operate in the range of 1.0 to 3.0 gram-atoms of phosphorus, arsenic or antimony (in the arsenide, stibide or phosphide), per mol of heavy metal compound. Additives such as hexamethyl phosphoramide may be incorporated in the catalysts, and will enhance the yield of crystalline polymers in the products, if this is desired. A preferred class of polymerization modifiers are the tetrakis (dimethylamino) silane, hexakis (dimethylamino) siloxane, etc., as described by Alfred R. Cain in U.S. patent application S.N. 126,788. The catalyst may either be prepared in a separate vessel, or may be prepared in the vessel in which the polymerization proper is to take place, and in this latter case may optionally be prepared in the presence of the monomers to be polymerized. The polymerization is carried out by contacting the monomers with the catalyst, preferably in a saturated liquid hydrocarbon vehicle such as suggested above, preferably with sufficient agitation to insure contact of the catalyst and monomers and to avoid segregation of the product. A preferred process for preparing highly reactive dispersions of phosphides, arsenides and stibides which are particularly adapted for reaction with the heavy metal compounds to form the instant catalysts is exemplified in Examples I and III in the case of sodium phosphide. The amount of vehicle employed should be, preferably, sufficient to avoid difficulty in agitation during the reaction, i.e., so that the concentration of the final polymer-product will not be over 50%, based on the total weight of polymer plus vehicle. The amount of catalyst should be such that it will reach economic exhaustion at about the same time that the vehicle contains all of the polymer it can carry without difficulty in agitation. Ordinarily it will be expected that each gram of catalyst will produce from 15 to 100 grams of polymer. The polymerization may be carried out batchwise, or in a continuous manner wherein the catalyst (or ingredients thereof), vehicle and monomer are continuously supplied to a reactor system and the resultant polymer solution or dispersion is continuously discharged from the reactor system. The polymeric products are purified by any suitable treatment, as by washing with alcohols, acids, ammonia and the like. The portions of the catalyst residues derived from the phosphides, arsenides, stibides, particularly when they involve metals of Groups I-A, magnesium and calcium and aluminum, are readily removable from the polymer, and in any event, are innocuous.

With the foregoing general discussion in mind, there are given herewith detailed examples of the practice of this invention. All parts and percentages are given on the basis of weight, unless the contrary is specifically indicated.

EXAMPLE I

(A) *Preparation of sodium phosphide*

| | |
|---|---|
| Sodium paste dispersion (35% sodium, in petrolatum) | 98.5 g. (1.5 g.-atom). |
| Red phosphorus | 15.5 g. (0.5 g.-atom). |
| White mineral oil [1] | 250 ml. |

[1] "Sohio light oil 72" a 72 Saybolt viscosity mineral oil distributed by the Standard Oil Company of Ohio. All further references in this and other examples to follow are intended to refer to this oil.

For this preparation there was provided a 500 ml. three-necked flask equipped with a nitrogen inlet, a vent, a rotary stirrer and a heating mantle. The mineral oil and sodium dispersion were charged first, followed by the phosphorus, after which the flask was purged with nitrogen, the flow of which was continued throughout the reaction to follow, stirring commenced and the temperature was raised to 95° C. This was continued for 4 hours, at the end of which the temperature was raised to 195° C. for 18 hours. The reaction mass was cooled to 25° C., and transferred to a storage bottle, which was purged with nitrogen, and the contents made up with mineral oil to provide a solution 1.0 molar in $Na_3P$, based on the phosphorus charged.

(B) *Polymerization*

| | |
|---|---|
| Heptane | 250 ml. |
| Sodium phosphide suspension (prepared as described at A above) | 1.5 ml. (1.5 millimols $Na_3P$). |
| The reaction product produced by reaction of $TiCl_4$ with metallic aluminum, followed by intensive grinding. This product, termed "AA" is produced by the Stauffer Chemical Co., 1 molar suspension, in mineral oil. Hereafter it is referred to as AA | 2 ml. (2.0 millimols). |
| Propylene | 25 grams. |

The heptane was charged into a 28-ounce beverage bottle, which was then flushed with nitrogen and sealed with a butadiene-acrylonitrile rubber-lined crown cap provided with a perforation for the hypodermic injection of reactants. The bottle was then inverted and placed in a cradle on a balance which was first brought to equilibrium and overweighted with a 25-gram weight. Propylene was injected through a conduit and hypodermic needle until the balance again was in equilibrium. The back pressure at this point was about 40 p.s.i.g. The sodium phosphide and AA suspensions were then hypodermically injected, and the bottle was placed on a polymerizer wheel which revolved and dipped the bottle in a water bath at 50° C. for 64 hours. At the end of this time the bottle was removed from the wheel, cooled to 25° C., and the pressure thereon determined to be 20 p.s.i.g. by means of a hypodermic gauge. The bottle was then vented and opened, and the polymer separated from the liquid vehicle by decantation. The solid product was then reslurried in heptane, the slurry poured into methanol and the mixture agitated for 15 minutes. The slurry mixture was then filtered, and the solid resinous product removed from the filter and dried in open air for 24 hours. This solid isotactic resinous product amounted to 10.7 grams, and was evaluated as follows.

*Percent hot-heptane insoluble.*—A sample of the polymer was extracted for 48 hours in a Soxhlet extractor with boiling heptane. The solution was evaporated to dryness, and the residue weighed. The difference between the weight of the sample and of the residue was taken as the hot-heptane insoluble material, and amounted to 87.7% based on the weight of sample. In the succeeding examples this is referred to as "Heptane Insoluble."

*Mechanical properties.*—Standard test specimens were molded at 180° C. and then annealed 2 hours at 125° C. The specimens had a bending modulus of 38,900 p.s.i. (referred to hereafter as "Modulus") and a Rockwell hardness (R-scale) of 38 (referred to hereafter as "Rockwell"). The product was suitable for fabrication into objects such as luggage casings, automotive panels, transparent films, and the like.

The liquid decanted from the polymerization mixture and filtrate from the re-slurrying operation (a two-phase system) was diluted with methanol and then heated to drive off the volatile material, leaving as a residue 10.1 grams of rubbery (i.e. atactic) material. It is assumed that a greater or lesser proportion of the mineral oil accompanying the catalyst ingredients (about 2.9 g. of oil) is in the rubbery material.

EXAMPLE II

Example I was precisely repeated, except that 2.0 millimols of the sodium phosphide were used. There were obtained 7.7 grams of a resinous isotactic product and 10.2 grams of a rubbery atactic product. The resinous product had a modulus of 46,600 p.s.i. and a Rockwell of 44.

EXAMPLE III

(A) *Preparation of sodium phosphide*

| | |
|---|---|
| Mineral oil | 250 ml. |
| White phosphorus | 12.1 g. (.39 g.-atom). |
| Sodium paste dispersion (in petrolatum, 35% Na) | 77 g. (1.17 g.-atom of Na). |

A 500 ml. three-necked flask provided with a nitrogen inlet, a nitrogen vent and a stirrer was used in the preparation. The phosphorus and mineral oil were charged first, and the flask heated to 150° C. with nitrogen flow to purge moisture. The phosphorus dissolved completely. Considerable condensation of phosphorus was noted in the nitrogen vent. The flask was then cooled to 25° C. The sodium paste was added in increments, evolution of heat being observed at each addition. The reaction mass was then stirred for 1 hour at room temperature, and thereafter at temperatures rising to 120° C. for a further hour. The reaction mass was then cooled to 25°

C. and transferred to a storage bottle which was flushed with nitrogen and sealed with a crown cap provided with tadiene-acrylonitrile rubber-lined crown cap provided with a perforation for the hypodermic injection of re-

TABLE 1

| Catalyst Ingredients Used (millimols) | | Temperature of Polymerization (° C.) | Pressure[1] in Bottle (p.s.i.g.) after— | | Yield (Grams) of Isotactic Resin | Atactic[2] Polymer | Run No. |
|---|---|---|---|---|---|---|---|
| Na₃P | AA | | 20 hours | 78 hours | | | |
| 0.5 | 2.0 | 50 | 41 | 30 | 4.8 | 5.2 | 1 |
| 1.0 | 2.0 | 50 | 37 | 23 | 6.8 | 6.7 | 2 |
| 2.0 | 2.0 | 50 | 40 | 23 | 7.1 | 8.4 | 3 |
| 0.5 | 4.0 | 50 | 39 | 21 | 7.3 | 8.5 | 4 |
| 1.0 | 4.0 | 50 | 33 | 12 | 13.4 | 11.0 | 5 |
| 2.0 | 4.0 | 50 | 32 | 8 | 13.0 | 10.9 | 6 |
| 4.0 | 4.0 | 50 | 34 | 8 | 11.9 | 13.3 | 7 |
| [3] 2.0 | 2.0 | 52 | 16 | 3 | 15 | -------- | 8 |

[1] Measured with contents of bottle at the temperature of polymerization.
[2] May include a greater or less proportion of the mineral oil introduced with the catalyst ingredients.
[3] 0.1 millimol of hexamethylphosphoramide added in this run.

a perforation for hypodermic withdrawal of the contents. The volume of the suspension was 465 ml., from which the concentration of Na₃P was calculated to be 0.765 N, based on the phosphorus charged and assuming 10% loss.

(B) *Polymerization*

A series of polymerizations was run according to the procedure of "Example I–B—Polymerization," except that the preparation of sodium phosphide described immediately hereinabove under "III–A—Preparation of Sodium Phosphide" was used in place of the corresponding preparation of Example I. The amounts of the sodium phosphide and of the AA used, and the temperature of polymerization, were varied from run to run as set forth herewith in Table 1. The pressure in the bottles was determined at intervals, and the decrease thereof from the original pressure taken as a measure of the degree to which polymerization had taken place. The products of polymerization were recovered as described in Example I.

In Table 1 above are particulars of the several runs.

EXAMPLE IV

The polymerization procedure of Example I was duplicated except that 2.0 millimols of the sodium phosphide of Example III was used, butene-1 was used in place of propylene, and the polymerization was terminated after 40 hours.

EXAMPLE V

Example IV was repeated excepting that 1.0 millimol of tetrakis (dimethylamino) silane (hereafter TDSI) were hypodermically injected with the catalyst. Upon filtering the methane slurry, there was separated 6.5 grams of isotactic polybutene and on flashing off the solvent from the residual liquor, there was obtained 2.5 grams of atactic polybutene.

EXAMPLE VI

An autoclave with a stainless steel liner was flushed with nitrogen, then charged with 200 ml. of heptane, 2 millimols of sodium phosphide, one millimol of TDSI, and 2 millimols of AA through a vent hole. The autoclave liner was then placed in a rocking bomb which had three times been flushed with nitrogen to 700 p.s.i. and the liner pressured to 600 p.s.i. with C.P. grade ethylene. The mixture was heated to 50° C. over night and allowed to cool slowly to room temperature the next day. The contents were then poured into 250 ml. of methanol and the resulting precipitate filtered, washed with additional methanol and dried. The highly crystalline polyethylene so formed was then pressed into a tough clear film.

EXAMPLE VII

A 28-ounce beverage bottle was charged with 250 ml. of heptane, flushed with nitrogen, and sealed with a butadiene-acrylonitrile rubber-lined crown cap provided with a perforation for the hypodermic injection of reactants. Hydrogen in varying amounts, as shown in the Table 1, was then injected, followed successively by 2.0 millimols of AA, 1.5 millimols of TDSI, and 1.0 millimol of sodium phosphide. The bottle was then inverted and placed in a cradle on a balance which was first brought to equilibrium and over-weighted with a 25-gram weight. Propylene was injected through a conduit and hypodermic needle until the balance was again in equilibrium. The back pressure at this point was about 40 p.s.i. The bottle was placed on a polymerizer wheel which revolved and dipped the bottle in a water bath at 50° C. for 41 hours. At the end of this time, the bottle was removed from the wheel, cooled to room temperature, vented, opened, and the mixture decanted into 250 ml. of methanol, stirred for five minutes, filtered, stirred with an additional 250 ml. of methanol containing 0.25 gram of a stabilizer, filtered, and dried at room temperature. The solvent residue was evaporated and the amount of atactic resin determined. The amount of hydrogen added, the number of grams of isotactic polymer, the number of grams of atactic polymer, the melt index, the modulus in pounds per square inch, and the Rockwell (R-scale) of the isotactic portion of the polymer are shown below.

TABLE 2

| H₂ | Isotactic | Atactic | Rockwell | Modulus | Melt Index |
|---|---|---|---|---|---|
| None | 13.2 | -------- | 89 | 116,200 | |
| | 19.5 | 1.4 | 85 | 95,800 | |
| | 17.1 | 1.3 | 87 | 105,600 | |
| 10 cc. (36 p.p.m.) | 21.0 | 2.1 | 92 | 108,300 | (¹) |
| | 20.7 | 1.2 | 92 | 121,600 | |
| | 20.0 | -------- | 92 | 122,300 | |
| 25 cc. (90 p.p.m.) | 20.0 | 1.8 | 98 | 148,900 | |
| | 20.3 | 1.8 | 98 | 166,200 | 0.03 |
| | 19.6 | -------- | 99 | 159,300 | |
| 50 cc. (180 p.p.m.) | 16.3 | -------- | 102 | 166,900 | |
| | 19.3 | 1.3 | 102 | 165,100 | 0.27 |
| | 17.6 | 1.4 | 102 | 172,200 | |
| 100 cc. (360 p.p.m.) | 16.8 | 1.7 | 104 | 194,500 | 0.77 |
| | 16.4 | 1.5 | 104 | 175,800 | 1.33 |
| | 14.7 | 1.8 | 105 | 167,800 | |
| | 15.0 | 1.4 | 105 | 207,900 | 0.98 |

[1] Too low to measure on equipment.

EXAMPLE VIII

A 28-ounce beverage bottle was charged with 250 ml. of heptane, flushed with nitrogen, and sealed with a butadiene-acrylonitrile rubber-lined crown cap provided with a perforation for the hypodermic injection of reactants. Then 2.0 millimols of AA and varying amounts of TDSI as shown in Table 3 were hypodermically injected and the bottle placed on a polymerizer wheel which revolved and dipped the bottle in a water bath at 50 C. for 4 hours. The bottle was then inverted and placed in a cradle on a balance which was first brought to equilibrium and then overweighted with a 25-gram weight. Propylene was injected through a conduit and hypodermic needle until the balance again was in equilibrium. Varying amounts of a 1.0 molar suspension of sodium phosphide were then hypodermically injected, the number of millimols in each run being shown in Table 3. The bottle was then placed on the polymerizer-wheel which revolved and dipped the bottle in the water bath at 50° C. for 66 hours. At the end of this time, the bottle was removed from the wheel, cooled to room temperature, vented and opened. The reaction product was then treated as in Example VII.

TABLE 3

| $Na_3P$ (millimols) | TDSI | AA | Isotactic | Atactic | Modulus | Rockwell | Heptane Insol. |
|---|---|---|---|---|---|---|---|
| 1.0 | 0.5 | 2.0 | 21.3 | 6.5 | 87,000 | 74 | 97.2 |
| 1.0 | 1.0 | 2.0 | 21.6 | 1.1 | 125,600 | 88 | 98.6 |
| 1.0 | 1.5 | 2.0 | 23.9 | 1.9 | 115,600 | 88 | 97.7 |
| 1.0 | 2.0 | 2.0 | 21.7 | 0.7 | 149,400 | 92 | 98.5 |
| 1.5 | 0.5 | 2.0 | 20.2 | 8.5 | 68,500 | 57 | 95.3 |
| 1.5 | 1.0 | 2.0 | 20.9 | 4.3 | 98,300 | 74 | 96.7 |
| 1.5 | 1.5 | 2.0 | 20.5 | 1.2 | 117,000 | 88 | 98.2 |
| 1.5 | 2.0 | 2.0 | 22.3 | 0.9 | 123,000 | 87 | 97.5 |
| 2.0 | 0.5 | 2.0 | 19.3 | 5.8 | 73,800 | 55 | 96.0 |
| 2.0 | 1.0 | 2.0 | 16.7 | 3.5 | 77,300 | 66 | 97.0 |
| 2.0 | 1.5 | 2.0 | 20.0 | 3.7 | 96,300 | 76 | 97.3 |
| 2.0 | 2.0 | 2.0 | 21.4 | 4.5 | 106,900 | 82 | 96.9 |

EXAMPLE IX

Example VIII was duplicated with the following exceptions:
(1) Potassium phosphide was substituted for the sodium phosphide;
(2) The AA and TDSI were reacted for 2 hours prior to charging with propylene;
(3) The polymerization was carried out for 70 hours.

The results are set forth in Table 4.

TABLE 4

| $K_3P$ (millimols) | TDSI | AA | Isotactic | Atactic | Modulus | Rockwell | Heptane Insol. |
|---|---|---|---|---|---|---|---|
| 1.0 | 1.0 | 2.0 | 21.4 | 2.3 | 111,600 | 82 | 95.1 |
| 1.5 | 1.0 | 2.0 | 23.2 | 3.8 | 108,900 | 78 | 93.8 |

EXAMPLE X

A 28-ounce beverage bottle was charged with 250 ml. of heptane, flushed with nitrogen, and sealed with a butadiene-acrylonitrile rubber-lined crown cap provided with a perforation for the hypodermic injection of reactants. The bottle was then inverted and placed in a cradle on a balance which was first brought to equilibrium and overweighted with a 25-gram weight. Propylene was injected through a conduit and hypodermic needle until the balance was again in equilibrium. Two millimols of AA were then hypodermically injected followed successively with 1 millimol of TDSI and varying amounts of sodium arsenide (prepared by heating equivalent amounts of sodium and arsenic under an argon blanket) as shown in Table 5. The reaction products were treated as in the above examples. The results of these runs are set forth in Table 5.

TABLE 5

| $Na_3As$ (millimols) | Isotactic | Atactic | Modulus | Rockwell | Heptane Insol. |
|---|---|---|---|---|---|
| 1.0 | 12.2 | 2.2 | 135,500 | 94 | 97.2 |
| 1.0 | 13.8 | 2.5 | 134,100 | 91 | 96.8 |
| 2.0 | 16.0 | 3.6 | 126,300 | 92 | 96.4 |
| 2.0 | 18.5 | 2.7 | 128,500 | 89 | 96.5 |

EXAMPLE XI

Example IX was duplicated using magnesium phosphide (prepared by heating equivalent amounts of magnesium and phosphorus under an argon blanket) in place of the potassium phosphide. In each run there were used 2 millimols of TDSI, 2 millimols of AA and in the three runs, one 1½ and 2 millimols respectively of magnesium phosphide. In each case there was obtained an isotactic polypropylene.

EXAMPLE XII

Example IX was duplicated using lithium phosphide in place of the potassium phosphide, except that the polymerization was carried out for only 41 hours. The results are shown in the following table.

TABLE 6

| $Li_3P$ (millimols) | TDSI | AA | Isotactic | Atactic | Modulus | Rockwell | Heptane Insol. |
|---|---|---|---|---|---|---|---|
| 1.0 | 1.0 | 2.0 | 16 | 1.85 | 123,600 | 85 | 95 |

EXAMPLE XIII

Two polymerization runs were carried out as in Example III, except for the treatment of the reaction product. In the one case the reaction product was poured into 250 ml. of methanol which had previously been reacted with 0.125 g. of sodium to form sodium methylate. The mixture was stirred for 15 minutes, filtered, washed with 100 ml. of methanol and dried overnight at room temperature. The other reaction product used as a control was treated in precisely the same manner except that the 250 ml. of methanol contained no sodium methylate. The control had a definite odor of phosphine and was a light yellow while the other run resulted in a polymer having a slight off-white color and an almost undetectable odor of phosphine.

The novel catalysts of the instant invention may be analogized to the "Ziegler-type" catalysts recently developed for producing highly crystalline and isotactic polymers of alpha-monoolefins in that they comprise the reaction of two different species of compounds. In the case of the Ziegler catalyst, one of the species is a transition metal compound and the other an organometallic compound. In the instant invention, one species is again a transition metal compound, preferably in a lower valence state, and the other a phosphide, arsenide or stibide as described hereinabove. In general, the procedures and materials found useful for deactivating and removing catalyst residues from the Ziegler polymerization products are also useful herein. While the preferred material to deactivate the catalyst is methanol added to the polymerization product prior to contact with air, other materials such as ethanol, isopropanol, butanol, water-alcohol mixtures, etc., may be used. Other procedures for treating the polymer products to improve the purity and clarity thereof, such as treatment with alkali, particularly alcoholic alkali solutions (i.e. sodium methylate), ammonia, sodium hydroxide, etc., acids, steam, chelating agents such as ethanolamine, citric acid, ethylenediamine tetraacetic acid, etc., may be used.

The novel catalysts of the instant invention are generically useful to polymerize materials which contain at least one active ethylenic unsaturation per molecule. Particularly preferred monomers are alpha-olefinic hydrocarbons having no more than ten carbon atoms. These monomers include particularly ethylene, propylene, butene-1, isobutene, pentene-1, 3-methylbutene-1, hexene-1, styrene, 3,3-dimethylbutene-1, 4-methylpentene-1, decene-1, etc.

In the case of copolymers, some monomers have a far greater rate of polymerization than others utilizing the catalysts of the instant invention. In such cases, the monomers are advantageously added incrementally to the polymerization reaction as polymerization proceeds so as to maintain the desired ratio of the monomers in the resulting copolymer.

The catalyst may be used in any known manner. Although all of the examples herein employ the catalyst in the solvent in which the catalyst was produced, the catalyst may be first purified, dried, and used in that state. For instance, the phosphide, arsenide or stibide may be interacted with a solid transition metal compound, placed on a suitable support, and used in a fixed bed reactor for a continuous polymerization process. This catalyst may also be employed in the solid state in a fluidized bed process, using the olefin monomer as the supporting fluid.

The chemical literature indicates that definite compounds, such as the phosphides, arsenides, and stibides shown above, are produced by reaction of any of the metals taught herein with the Group V-A elements mentioned above. However, the catalysts of the invention include such reaction products regardless of their exact chemical constitution.

Another characterization of suitable solvents for the polymerization reaction of the invention is that they are non-protic, i.e., the preferred solvents do not supply protons (which would react with the catalyst) under usual conditions of polymerization.

The titanium trichloride-aluminum reaction product referred to above as "AA" is produced at moderately elevated temperatures in the order of 90° C. in approximately the mol ratio of 3 mols of titanium tetrachloride to one gram-atom of metal. The reaction product has the empirical formula $Ti_3AlCl_{12}$, and appears to be a true compound of all of these elements, since any excess of titanium tetrachloride may be leached there from down to, but not beyond, the composition of the formula given. The sample reaction product prepared, as just described, should preferably be subjected to an "activation" process, after which it is known as an "activated" preparation and is suitable for use in this invention. The intermediate sample reaction product is subjected to intensive grinding as in a ball mill, edge runner, roll mill, disc mill, impact mill, or the like. In general, the extent of the grinding should be such that the power consumed in the process will amount to at least about .03 kilowatt hours per gram of material. The function of this grinding is not alone to reduce the particle size, but seems also to develop certain hyperactive, strained, crystal defect areas in the material as the crystalline X-ray defraction pattern changes progressively during the grinding.

From the foregoing general discussion and detailed experimental examples, it will be evident that the present invention provides a novel process for the polymerization of ethylenically unsaturated compounds, and particularly olefins, which is operable under mild conditions of pressure and temperature and which makes use of novel and inexpensive catalytic compositions. The macro-molecular products obtained are useful resins, rubbers and the like, and may be used to produce molding resins, fibers, films, rubber cements, etc.

The instant application is a continuation-in-part of my co-pending application, Serial No. 102,957.

What is claimed is:

1. The process which comprises polymerizing an ethylenically unsaturated compound by contacting the same with a catalyst comprising (A) a compound selected from the group consisting of phosphides, arsenides and stibides of a cation selected from the class consisting of the metals of Groups I-A, II-A, II-B, III-A and IV-A of the Periodic Table, plus (B) a compound of the heavy metals.

2. A process according to claim 1 wherein said cation is a Group I-A metal.

3. A process according to claim 1 wherein said cation is a Group II-A metal.

4. Process according to claim 1 wherein said compound (A) is an arsenide.

5. A process according to claim 4 wherein said arsenide is one which reacts with water to liberate arsine.

6. A process according to claim 4 wherein said cation is a Group I-A metal.

7. A process according to claim 4 wherein said cation is a Group II-A metal.

8. Process according to claim 1 wherein said compound (A) is a phosphide.

9. A process according to claim 8 wherein said phosphide is one which reacts with water to liberate phosphine.

10. A process according to claim 8 wherein said cation is a Group I-A metal.

11. A process according to claim 8 wherein said cation is a Group II-A metal.

12. Process according to claim 1 wherein said compound (A) is a stibide.

13. A process according to claim 12 wherein said stibide is one which reacts with water to liberate stibine.

14. A process according to claim 12 wherein said cation is a Group I-A metal.

15. A process according to claim 12 wherein said cation is a Group II-A metal.

16. Process of claim 1 wherein said compound of the heavy metals is a titanium compound.

17. Process of claim 8 wherein said ethylenically unsaturated compound is an olefin.

18. The process which comprises polymerizing an olefin by contacting the same with a catalyst comprising (A) sodium phosphide, plus (B) a compound of the heavy metals.

19. The process which comprises polymerizing propylene by contacting the same with a catalyst comprising (A) sodium phosphide, plus (B) a compound of the heavy metals.

20. The process which comprises polymerizing propylene by contacting the same with a catalyst comprising (A) sodium phosphide, plus (B) the reaction product of titanium tetrachloride and aluminum.

21. The process which comprises polymerizing propylene by contacting the same with a catalyst comprising (A) sodium phosphide, plus (B) a titanium chloride.

22. A process comprising polymerizing an ethylenically unsaturated compound by contacting the same with a catalyst comprising an alkali metal phosphide, plus a transition metal compound.

23. A process comprising polymerizing an alpha-olefinic hydrocarbon having no more than 10 carbon atoms by contacting the same with a catalyst comprising an alkali metal phosphide, plus a transition metal compound.

24. A process comprising polymerizing a conjugated diolefin by contacting the same with a catalyst comprising an alkali metal phosphide plus a transition metal compound.

25. A process comprising polymerizing a conjugated diolefin by contacting the same with a catalyst comprising a phosphide of a Group II–A metal plus a transition metal compound.

26. A catalytic composition comprising (A) a compound selected from the group consisting of phosphides, arsenides, and stibides of the metals of Groups I–A, II–A, II–B, III–A and IV–A of the Periodic Table, plus (B) a compound of the heavy metals.

27. Catalytic composition according to claim 26 wherein said compound (A) is a phosphide.

28. Catalytic composition according to claim 26 wherein said heavy metal compound (B) is a titanium compound.

29. A catalytic composition comprising (A) sodium phosphide, plus (B) a compound of the heavy metals.

30. A catalytic composition comprising an alkali metal phosphide, plus the reaction product of aluminum and titanium tetrachloride.

31. A catalytic composition according to claim 26 including a polymerization modifier.

32. A catalytic composition according to claim 30 including a polymerization modifier.

33. A catalytic composition comprising (A) sodium phosphide, plus (B) titanium trichloride.

References Cited by the Examiner

UNITED STATES PATENTS 3,026,309   3/62   Coover _____ 260—93.7

JOSEPH L. SCHOFER, *Primary Examiner.*